US012743440B2

(12) United States Patent
Kunjal Chandrahas et al.

(10) Patent No.: US 12,743,440 B2
(45) Date of Patent: Sep. 22, 2026

(54) SYSTEM, METHOD, AND COMPUTER PROGRAM PRODUCT FOR DATA CONTROLLER PLATFORM

(71) Applicant: Visa International Service Association, San Francisco, CA (US)

(72) Inventors: Shreyas Kunjal Chandrahas, Bangalore (IN); Saurabh Chandra, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 4 days.

(21) Appl. No.: 18/722,194

(22) PCT Filed: Sep. 8, 2022

(86) PCT No.: PCT/US2022/042865

§ 371 (c)(1),
(2) Date: Jun. 20, 2024

(87) PCT Pub. No.: WO2023/121726

PCT Pub. Date: Jun. 29, 2023

(65) Prior Publication Data

US 2025/0124043 A1 Apr. 17, 2025

Related U.S. Application Data

(60) Provisional application No. 63/292,009, filed on Dec. 21, 2021.

(51) Int. Cl.
*G06F 16/25* (2019.01)

(52) U.S. Cl.
CPC .......... *G06F 16/254* (2019.01); *G06F 16/258* (2019.01)

(58) Field of Classification Search
CPC ............................ G06F 16/254; G06F 16/258
See application file for complete search history.

(56) References Cited

U.S. PATENT DOCUMENTS

| | | | | |
|---|---|---|---|---|
| 11,074,107 | B1 | 7/2021 | Nandakumar | |
| 11,843,664 | B1 * | 12/2023 | Lai | H04L 63/104 |
| 2017/0063615 | A1 * | 3/2017 | Yang | H04L 67/62 |
| 2018/0052861 | A1 | 2/2018 | Seetharaman et al. | |
| 2018/0196838 | A1 | 7/2018 | Meacham et al. | |
| 2019/0377817 | A1 * | 12/2019 | McCluskey | G06F 16/258 |
| 2020/0012593 | A1 | 1/2020 | Maag et al. | |
| 2022/0188691 | A1 * | 6/2022 | Katz | G06N 20/00 |
| 2022/0374442 | A1 * | 11/2022 | Kaspa | G06F 16/2282 |
| 2022/0383183 | A1 * | 12/2022 | Gao | G06N 20/00 |

FOREIGN PATENT DOCUMENTS

| | | | |
|---|---|---|---|
| WO | 2021038432 | A1 | 3/2021 |

* cited by examiner

*Primary Examiner* — Courtney Harmon
(74) *Attorney, Agent, or Firm* — The Webb Law Firm

(57) ABSTRACT

Provided are systems for controlling a data pipeline in a data pipeline ecosystem that include at least one processor to receive metadata parameters for a data pipeline, store the metadata parameters in a data repository, generate a logical representation of the data pipeline based on the metadata parameters, execute the data pipeline based on the metadata parameters of the data pipeline, and model the data pipeline using the directed acyclic graph (DAG) of the data pipeline. Methods and computer program products are also provided.

17 Claims, 6 Drawing Sheets

200

SYSTEM, METHOD, AND COMPUTER PROGRAM PRODUCT FOR DATA CONTROLLER PLATFORM

CROSS REFERENCE TO RELATED APPLICATIONS

This application is the United States national Phase of International Patent Application No. PCT/US2022/042865 filed Sep. 8, 2022, and claims the benefit of U.S. Provisional Patent Application No. 63/292,009, filed on Dec. 21, 2021, the disclosures of which are hereby incorporated by reference in their entireties.

BACKGROUND

1. Technical Field

This disclosure relates generally to data pipelines and, in some non-limiting embodiments or aspects, to systems, methods, and computer program products for a data controller platform for controlling a data pipeline in a data pipeline ecosystem.

2. Technical Considerations

A data pipeline may refer to a set of data processing elements that are used to automate movement and/or transformation of data (e.g., datasets) between a source, such as a source system, and a destination, such as a target repository for the data. In some instances, the data processing elements may be connected in series where an output of one data processing element is an input to another data processing element. The data processing elements of a data pipeline may be executed in parallel or in a time-sliced (e.g., preemptive multitasking) fashion. Some amount of buffer storage may be provided between consecutive data processing elements in a data pipeline.

A distributed computing system may refer to a system that includes a group of networked computers, where components of the system may include or be located on different networked computers. The networked computers may communicate and coordinate actions by passing messages to one another. In addition, the networked computers may interact with one another in order to achieve a common goal. Three significant characteristics of distributed computing systems may include concurrency of components, lack of a global clock, and independent failure of components. A distributed computing system may be designed to deal with a central challenge that, when components of the distributed computing system fail, the entire system does not fail. Examples of distributed computing systems may include service-oriented architecture (SOA) based systems, multiplayer online games, and peer-to-peer applications.

However, with the usage of a distributed computing system and associated distributed data storage, it may be difficult to obtain a topology and/or data lineage of the datasets and the data pipelines that are used within the distributed computing system. The topology and/or data linage of the datasets may describe how data is to be acquired, how data pipelines are supposed to execute, and/or how data is to be written to a target data repository. With this, if a data pipeline fails, that failure may have a cascading effect and determining a root cause of the failure may be extremely complicated. This may be because a downstream consumer of a dataset involved in a data pipeline does not have the ability to know the semantics of the dataset produced by the data pipeline unless a full picture of the topology and/or data lineage is captured in a central manner.

SUMMARY

Accordingly, disclosed are improved systems, methods, and computer program products for controlling a data pipeline in a data pipeline ecosystem.

According to some non-limiting embodiments or aspects, disclosed is a computer implemented method for determining a characteristic of a data pipeline, which may include receiving, with at least one processor, metadata parameters for a data pipeline; storing, with at least one processor, the metadata parameters in a data repository; generating, with at least one processor, a logical representation of the data pipeline based on the metadata parameters; executing, with at least one processor, the data pipeline based on the metadata parameters of the data pipeline; and modeling, with at least one processor, the data pipeline using the logical representation of the data pipeline.

According to some non-limiting embodiments or aspects, disclosed is a system for determining a characteristic of a data pipeline, which may include at least one processor that is programmed or configured to: receive metadata parameters for a data pipeline; store the metadata parameters in a data repository; generate a logical representation of the data pipeline based on the metadata parameters; execute the data pipeline based on the metadata parameters of the data pipeline; and model the data pipeline using the logical representation of the data pipeline.

According to some non-limiting embodiments or aspects, disclosed is a computer program product, the computer program product comprising at least one non-transitory computer readable medium including one or more instructions that, when executed by at least one processor, cause the at least one processor to: receive metadata parameters for a data pipeline; store the metadata parameters in a data repository; generate a logical representation of the data pipeline based on the metadata parameters; execute the data pipeline based on the metadata parameters of the data pipeline; and model the data pipeline using the logical representation of the data pipeline.

Further non-limiting embodiments or aspects are set forth in the following numbered clauses:

Clause 1: A computer implemented method for determining a characteristic of a data pipeline, comprising: receiving, with at least one processor, metadata parameters for a data pipeline; storing, with at least one processor, the metadata parameters in a data repository; generating, with at least one processor, a logical representation of the data pipeline based on the metadata parameters; executing, with at least one processor, the data pipeline based on the metadata parameters of the data pipeline; and modeling, with at least one processor, the data pipeline using the logical representation of the data pipeline.

Clause 2: The computer implemented method of clause 1, further comprising: providing data associated with a status of the data pipeline in a user interface (UI).

Clause 3: The computer implemented method of clauses 1 or 2, further comprising: executing an application programming interface (API) to determine whether an input dataset of the data pipeline is available.

Clause 4: The computer implemented method of any of clauses 1-3, further comprising: determining data quality metrics associated with the data pipeline based on an output dataset of the data pipeline; and displaying the data quality metrics associated with the data pipeline in a UI.

Clause 5: The computer implemented method of any of clauses 1-4, further comprising: executing one or more data flow activities using the data pipeline based on executing the data pipeline.

Clause 6: The computer implemented method of any of clauses 1-5, further comprising: determining one or more data parameters associated with the one or more data flow activities based on executing the one or more data flow activities; and transmitting a status message that includes the one or more data parameters associated with the one or more data flow activities.

Clause 7: The computer implemented method of any of clauses 1-6, wherein the metadata parameters comprise: a log of one or more input datasets; wherein the method further comprises: generating an executable file based on the metadata parameters of the data pipeline; wherein executing the data pipeline comprises: executing the executable file for the data pipeline based on determining that the one or more input datasets of the data pipeline are available.

Clause 8: A system for determining a characteristic of a data pipeline, comprising: at least one processor, wherein the at least one processor is programmed or configured to: receive metadata parameters for a data pipeline; store the metadata parameters in a data repository; generate a logical representation of the data pipeline based on the metadata parameters; execute the data pipeline based on the metadata parameters of the data pipeline; and model the data pipeline using the logical representation of the data pipeline.

Clause 9: The system of clause 8, wherein the at least one processor is further programmed or configured to: provide data associated with a status of the data pipeline in a user interface (UI).

Clause 10: The system of clauses 8 or 9, wherein the processor is further programmed or configured to: execute an application programming interface (API) call to determine whether an input dataset of the data pipeline is available.

Clause 11: The system of any of clauses 8-10, wherein the at least one processor is further programmed or configured to: determine data quality metrics associated with the data pipeline based on an output dataset of the data pipeline; and display the data quality metrics associated with the data pipeline in a UI.

Clause 12: The system of any of clauses 8-11, wherein the processor is further programmed or configured to: execute one or more data flow activities using the data pipeline based on executing the data pipeline.

Clause 13: The system of any of clauses 8-12, wherein the at least one processor is further programmed or configured to: determine one or more data parameters associated with the one or more data flow activities based on executing the one or more data flow activities; and transmit a status message that includes the one or more data parameters associated with the one or more data flow activities.

Clause 14: The system of any of clauses 8-13, wherein the metadata parameters comprise: a log of one or more input datasets; wherein the at least one processor is further programmed or configured to: generate an executable file based on the metadata parameters of the data pipeline; wherein, when executing the data pipeline, the at least one processor is programmed or configured to: execute the executable file for the data pipeline based on determining that the one or more input datasets of the data pipeline are available.

Clause 15: A computer program product, the computer program product comprising at least one non-transitory computer readable medium including one or more instructions that, when executed by at least one processor, cause the at least one processor to: receive metadata parameters for a data pipeline; store the metadata parameters in a data repository; generate a logical representation of the data pipeline based on the metadata parameters; execute the data pipeline based on the metadata parameters of the data pipeline; and model the data pipeline using the logical representation of the data pipeline.

Clause 16: The computer program product of clause 15, wherein the one or more instructions further cause the at least one processor to: provide data associated with a status of the data pipeline in a user interface (UI).

Clause 17: The computer program product of clauses 15 or 16, wherein the one or more instructions further cause the at least one processor to: execute an application programming interface (API) to determine whether an input dataset of the data pipeline is available.

Clause 18: The computer program product of any of clauses 15-17, wherein the one or more instructions further cause the at least one processor to: determine data quality metrics associated with the data pipeline based on an output dataset of the data pipeline; and display the data quality metrics associated with the data pipeline in a UI.

Clause 19: The computer program product of any of clauses 15-18, wherein the one or more instructions further cause the at least one processor to: execute one or more data flow activities using the data pipeline based on executing the data pipeline.

Clause 20: The computer program product of any of clauses 15-19, wherein the one or more instructions further cause the at least one processor to: determine one or more data parameters associated with the one or more data flow activities based on executing the one or more data flow activities; and transmit a status message that includes the one or more data parameters associated with the one or more data flow activities.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

DETAILED DESCRIPTION

Figure 1:
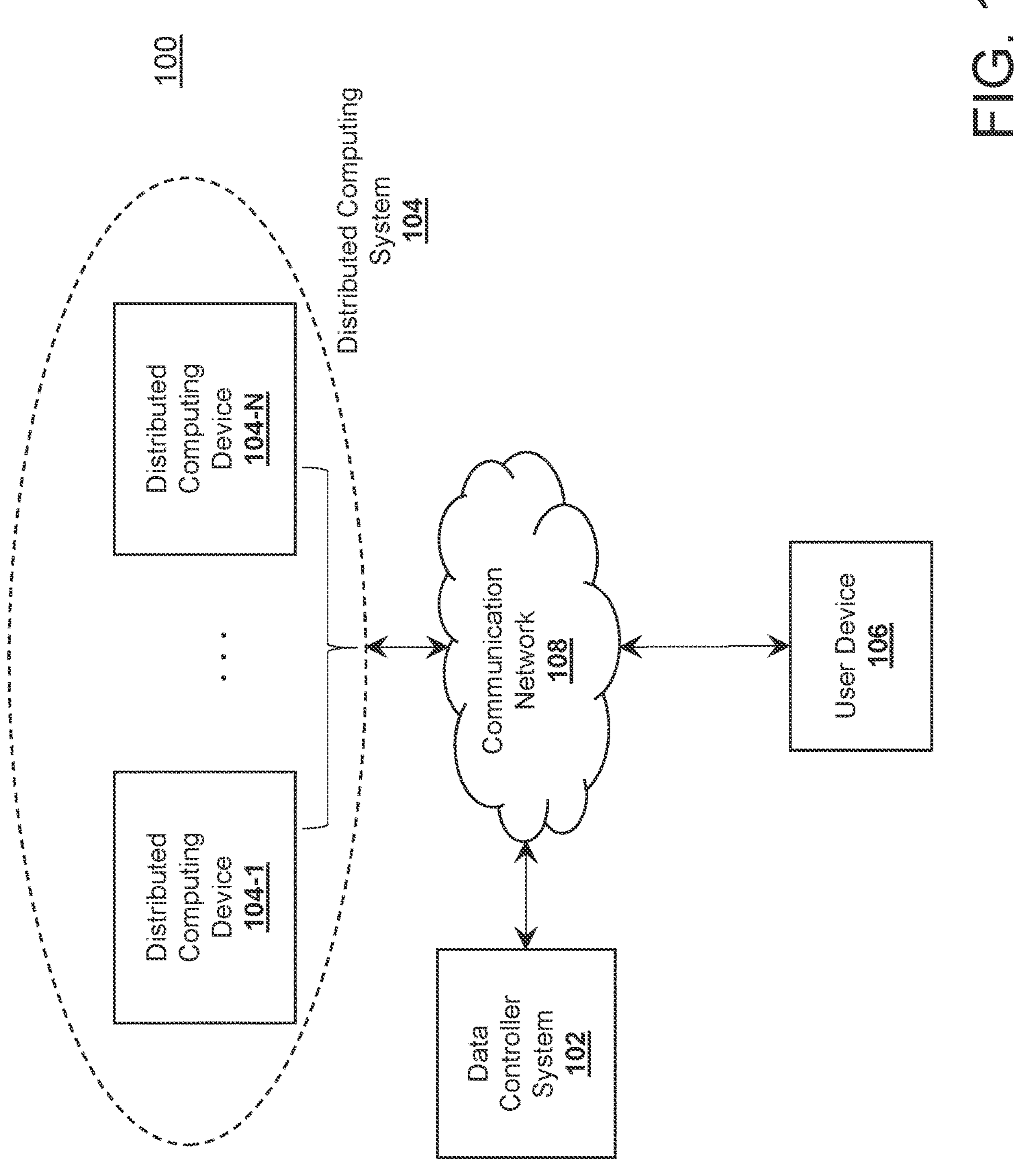
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity. As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices. Further, as used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices such as, but not limited to, processors, servers, client devices, software applications, and/or other like components. Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Provided are systems, methods, and computer program products for controlling a data pipeline in a data pipeline ecosystem. Non-limiting embodiments or aspects of the present disclosure may include a machine learning prediction system that includes at least one processor programmed or configured to receive metadata parameters for a data pipeline, store the metadata parameters in a data repository, generate a logical representation, such as a directed acyclic graph (DAG), of the data pipeline based on the metadata parameters, execute the data pipeline based on the metadata parameters of the data pipeline, and model the data pipeline using the DAG of the data pipeline.

In some non-limiting embodiments or aspects, the at least one processor is further programmed or configured to provide data associated with a status of the data pipeline in a user interface (UI). In some non-limiting embodiments or aspects, the at least one processor is further programmed or configured to execute an application programming interface (API) to determine whether an input dataset of the data pipeline is available. In some non-limiting embodiments or aspects, the at least one processor is further programmed or configured to determine data quality metrics associated with the data pipeline based on an output dataset of the data pipeline and display the data quality metrics associated with the data pipeline in a UI. In some non-limiting embodiments or aspects, the at least one processor is further programmed or configured to execute one or more data flow activities using the data pipeline based on executing the data pipeline. In some non-limiting embodiments or aspects, the at least one processor is further programmed or configured to determine one or more data parameters associated with the one or more data flow activities based on executing the one or more data flow activities and transmit a status message that includes the one or more data parameters associated with the one or more data flow activities. In some non-limiting embodiments or aspects, the metadata parameters comprise a log of one or more input datasets, and the at least one processor is further programmed or configured to generate an executable file based on the metadata parameters of the data pipeline, wherein when executing the data pipeline, the at least one processor is programmed or configured to execute the executable file for the data pipeline based on determining that the one or more input datasets of the data pipeline are available.

In this way, non-limiting embodiments or aspects of the present disclosure allow for obtaining a topology and/or data lineage of datasets and data pipelines that are used within a distributed computing system. Additionally, non-limiting embodiments or aspects of the present disclosure allow determining a root cause of a failure of a data pipeline because a consumer of a dataset involved in a data pipeline may have the ability to know the semantics of the dataset produced by the data pipeline.

Referring now to FIG. 1, FIG. 1 is a diagram of an example environment 100 in which devices, systems, methods, and/or products described herein may be implemented. As shown in FIG. 1, environment 100 includes data controller system 102, two or more distributed computing devices 104-1 through 104-N (referred to collectively as distributed computing system 104 and individually as distributed computing device 104, where appropriate), and user device 106. Data controller system 102, distributed computing system 104, and user device 106 may interconnect (e.g., establish a connection to communicate and/or the like) via wired connections, wireless connections, or a combination of wired and wireless connections.

Data controller system 102 may include one or more computing devices configured to communicate with distributed computing device 104, and/or user device 106 via communication network 108. For example, data controller system 102 may include a group of servers and/or other like devices. In some non-limiting embodiments or aspects, data controller system 102 may be associated with (e.g., operated by) a transaction service provider, as described herein. Additionally or alternatively, data controller system 102 may be a component of distributed computing device 104.

In some non-limiting embodiments or aspects, data controller system 102 may operate based on a plurality of microservices. In some non-limiting embodiments or aspects, the plurality of microservices may include a catalog service, a checkpoint service, a channel service, a dependency service, a scheduler service, a dataflow manager service, and/or an identity service. In some non-limiting embodiments or aspects, the catalog service may store metadata (e.g., metadata parameters) coming from a metadata definer and/or may orchestrate function calls between various services, based on a type of an artifact, where an artifact may include a dataset, a publication, a subscription, a data pipeline, and/or the like. In some non-limiting embodiments or aspects, the checkpoint service may provide an interface for one or more extract, transform, and load (ETL) applications to monitor (e.g., checkpoint) the status of various stages in an ETL data pipeline which may provide dependency management and determine data availability for the ETL pipeline to consume one or more datasets. A status of the datasets may be displayed in a UI provided by the checkpoint service. In some non-limiting embodiments or aspects, the channel service may provide for dataset usage across different applications. In some non-limiting embodiments or aspects, the dependency service may store data associated with a relation between an artifact at various levels for applications, activities, and/or datasets. The data may be used to generate one or more lineage graphs associated with datasets. In some non-limiting embodiments or aspects, the scheduler service may schedule a data pipeline based on metadata defined by the metadata definer to be instantiated and/or executed. The scheduler service may provide abstraction for a data asset application from underlying schedulers. In some non-limiting embodiments or aspects, the dataflow manager service may automatically cause the movement of data between disparate data sources and systems so that data ingestion may be properly managed. In some non-limiting embodiments or aspects, the identity service may provide functionality for token management and role-based access control (RBAC).

In some non-limiting embodiments or aspects, data controller system 102 may operate in a redundant fashion. For example, an instantiation of data controller system 102 may operate at a first location and a second instantiation of data controller system 102 may operate at a second location, where the second location is different form the first location. In some non-limiting embodiments or aspects, a load balancer system may be provided to balance tasks (e.g., jobs) that are carried out by each instantiation of data controller system 102.

Distributed computing device 104 may include one or more computing devices configured to communicate with data controller system 102 and/or user device 106 via communication network 108. For example, distributed computing device 104 may include a group of servers and/or other like devices. In some non-limiting embodiments or aspects, distributed computing device 104 may be associated with (e.g., operated by) a transaction service provider, as described herein. In some non-limiting embodiments or aspects, distributed computing device 104 may be associated with an entity (e.g., a transaction service provider) that operates a credit card network and that processes payments for credit accounts, debit accounts, credit cards, debit cards, and/or the like. In some non-limiting embodiments or aspects, distributed computing device 104 may be in communication with a data storage device, which may be local or remote to the distributed computing device 104. In some non-limiting embodiments or aspects, distributed computing device 104 may be capable of receiving information from, storing information in, communicating information to, or searching information stored in the data storage device. In some non-limiting embodiments or aspects, distributed computing device 104 may include data controller system 102. For example, data controller system 102 may be a component of distributed computing device 104.

User device 106 may include one or more computing devices configured to communicate with data controller system 102 and/or distributed computing device 104 via communication network 108. For example, user device 106 may include a desktop computer (e.g., a client device that communicates with a server), a mobile device, and/or the like. User device 106 may be configured to communicate with merchant system 108 via a short-range wireless communication connection (e.g., an NFC communication connection, an RFID communication connection, a Bluetooth® communication connection, and/or the like). In some non-limiting embodiments or aspects, user device 106 may be associated with a user (e.g., an individual operating a device). In some non-limiting embodiments or aspects, user device 106 may display a UI that includes information received from data controller system 102 and/or distributed computing device 104. For example, user device 106 may display a UI that includes data associated with a data pipeline.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
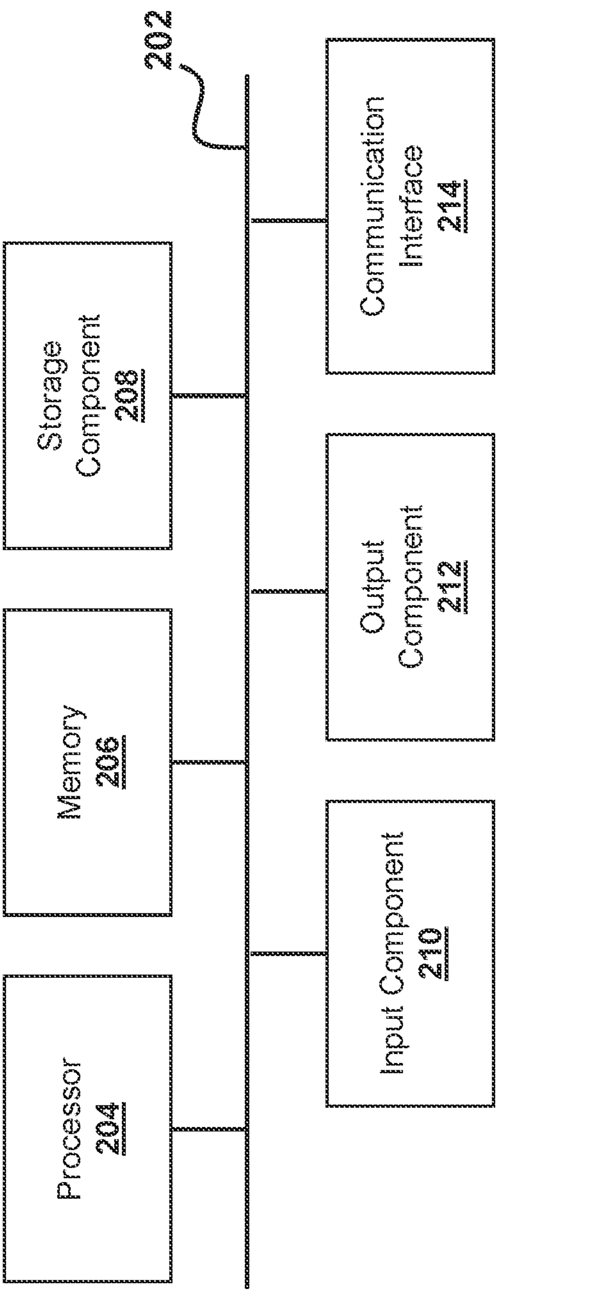
FIG. 2 is a diagram of a non-limiting embodiment or aspect of components of one or more devices and/or one or more systems of FIG. 1.

Referring now to FIG. 2, FIG. 2 is a diagram of example components of device 200. Device 200 may correspond to data controller system 102 (e.g., one or more devices of data controller system 102), distributed computing device 104, and/or user device 106. In some non-limiting embodiments or aspects, data controller system 102, distributed computing device 104, and/or user device 106 may include at least one device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
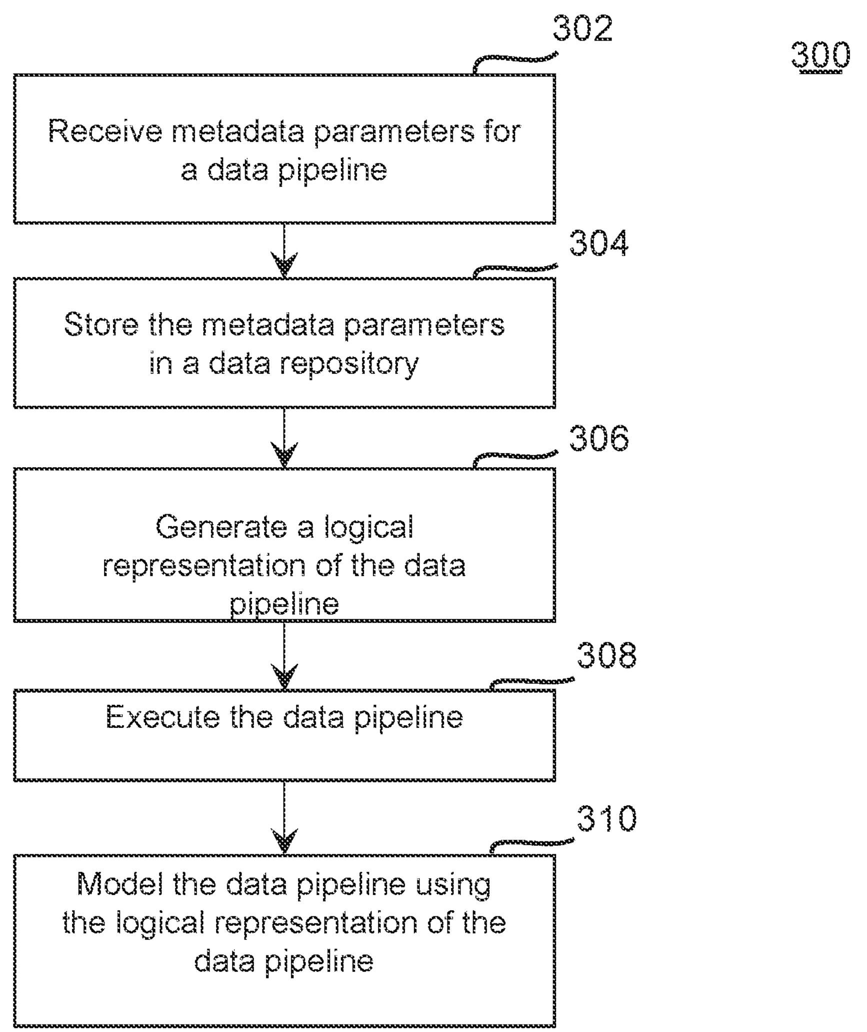
FIG. 3 is a flowchart of non-limiting embodiments or aspects of a process for controlling a data pipeline in a data pipeline ecosystem.

Referring now to FIG. 3, FIG. 3 is a flowchart of non-limiting embodiments or aspects of a process 300 controlling a data pipeline in a data pipeline ecosystem. In some non-limiting embodiments or aspects, one or more of the functions described with respect to process 300 may be performed (e.g., completely, partially, etc.) by data controller system 102. In some non-limiting embodiments or aspects, one or more of the steps of process 300 may be performed (e.g., completely, partially, and/or the like) by another device or a group of devices separate from or including data controller system 102, such as distributed computing device 104 and/or user device 106. In some non-limiting embodiments or aspects, one or more of the functions described with respect to process 300 may be performed by a virtual computing resource operated by data controller system 102. For example, one or more of the functions described with respect to process 300 may be performed by a virtual machine, a container, and/or the like.

As shown in FIG. 3, at step 302, process 300 may include receiving metadata parameters for a data pipeline. For example, data controller system 102 may receive the metadata parameters (e.g., pipeline metadata) for the data pipeline. In some non-limiting embodiments or aspects, data controller system 102 may receive the metadata parameters for the data pipeline and use the metadata parameters to instantiate the data pipeline in distributed computing system 104. In some non-limiting embodiments or aspects, the metadata parameters may include static metadata parameters and/or dynamic metadata parameters. In some non-limiting embodiments or aspects, the metadata parameters may include data associated with one or more input datasets of a data pipeline (e.g., a log of one or more input datasets of a data pipeline), data associated with transformation logic of a data pipeline (e.g., data associated with operators and configuration details of the data pipeline), data associated with a mapping (e.g., dependency data) of an input to an output of a data pipeline, and/or data associated with one or more output datasets of a data pipeline (e.g., a log of one or more output datasets of a data pipeline). In some non-limiting embodiments or aspects, data controller system 102 may receive the metadata parameters from user device 106 that is associated with a user (e.g., a programmer, a data developer, and/or the like). In some non-limiting embodiments or aspects, data controller system 102 may receive data associated with the metadata parameters from user device 106, and data controller system 102 (e.g., a metadata definer of data controller system 102) may generate the metadata parameters based on the data.

In some non-limiting embodiments or aspects, transformation logic of a data pipeline may include one or more operations that are to be carried out on data that flows in the data pipeline. For example, transformation logic may include an aggregation operation, an attribute construction operation, a discretization operation, a generalization operation, an integration operation, a manipulation operation, a normalization operation, and/or a smoothing operation. In some non-limiting embodiments or aspects, an aggregation operation may include an operation where raw data is gathered and expressed in a summary form for statistical analysis. For example, the raw data may be aggregated over a time period (e.g., a user specified time period, a predetermined time period, and/or the like) to provide statistics, such as average, minimum, maximum, sum, and/or count. In some non-limiting embodiments or aspects, an attribute construction may include an operation where new attributes are constructed and added from a set of attributes. The new attributes may be during data mining processes. In some non-limiting embodiments or aspects, a discretization operation may include an operation that involves converting continuous or substantially continuous data attribute values into a finite set of intervals and associating a specific data value with each interval. In some non-limiting embodiments or aspects, a generalization operation may include an operation of generating layers (e.g., successive layers) of summary data in an evaluational database. In this way, a comprehensive view of a problem and/or situation may be provided by the layers of summary data. In some non-limiting embodiments or aspects, an integration operation may include an operation that involves combining data residing in different sources (e.g., input datasets of a data pipeline) and providing a view of the data from the different sources in a combined view (e.g., a unified view). In some non-limiting embodiments or aspects, a manipulation operation may include an operation that involves a process of changing one or more aspects of data to make the data more legible and/or comprehendible (e.g., organized in a way to be better understood). In some non-limiting embodiments or aspects, a normalization operation may include an operation to convert data received from a data source into another format to allow for processing of the data. In some non-limiting embodiments or aspects, a smoothing operation may include an operation for detecting a trend in data having noise where a shape of the trend is unknown at an initial point in time.

As shown in FIG. 3, at step 304, process 300 may include storing the metadata parameters in a data repository. For example, data controller system 102 may store the metadata parameters in a data repository, such as a metadata repository. In some non-limiting embodiments or aspects, data controller system 102 may store the metadata parameters in the data repository based on receiving an indication of approval of the metadata parameters from user device 106. In some non-limiting embodiments or aspects, data controller system 102 may generate an executable file for the data pipeline based on the metadata parameters of the data pipeline. The executable file for the data pipeline may include code, and the code may include one or more database queries for collecting types (e.g., categories) of pipeline metadata from a data repository. In some non-limiting embodiments or aspects, data controller system 102 may generate the executable file for the data pipeline based on the code. In some non-limiting embodiments or aspects, the code may be in a script format. In some non-limiting embodiments or aspects, data controller system 102 may store the executable file for the data pipeline in a data repository, such as a pipeline repository. In some non-limiting embodiments or aspects, user device 106 may upload an executable file to the data repository.

In some non-limiting embodiments or aspects, the data repository that stores the executable file for the data pipeline may be a different data repository than the data repository that stores the metadata parameters of the data pipeline. In this way, executable files for data pipelines may be stored in a different data repository than a data repository in which metadata parameters for the data pipelines are stored. Accordingly, the executable files are decoupled from the metadata parameters and changes to either the executable files or the metadata parameters are easier to make than in a case where executable files are stored in the same data repository as the metadata parameters.

In some non-limiting embodiments or aspects, data controller system 102 may determine that a change has been made to metadata parameters for a data pipeline, and data controller 102 may generate a job associated with the change in the metadata parameters. Data controller system 102 may provide the change to a catalog service of data controller system 102 via an application programming interface (API) (e.g., a catalog API). In some non-limiting embodiments or aspects, data controller system 102 may provide data associated with metadata parameters in a JavaScript object notation (JSON) format to the catalog service. In some non-limiting embodiments or aspects, data controller system 102 may provide the data associated with metadata parameters to the catalog service in a first data format and data controller system 102 may convert the metadata parameters to a JSON format. In some non-limiting embodiments or aspects, data controller system 102 may store the metadata parameters in a data format, such as a JSON format, in a data structure (e.g., a database).

In some non-limiting embodiments or aspects, data controller system 102 (e.g., a scheduler service of data controller system 102) may receive the pipeline metadata (e.g., from a catalog service of data controller system 102) and validate the pipeline metadata based on receiving the pipeline metadata.

As shown in FIG. 3, at step 306, process 300 may include generating a logical representation of the data pipeline. For example, data controller system 102 may generate the logical representation of the data pipeline. In some non-limiting embodiments or aspects, the logical representation may be a representation of a topology of the data pipeline. In some non-limiting embodiments or aspects, data controller system 102 may generate the logical representation of the data pipeline based on determining that the pipeline metadata is valid.

In some non-limiting embodiments or aspects, data controller system 102 may generate an executable file for the data pipeline, where the executable file includes the logical representation of the data pipeline. Data controller system 102 may store the executable file, which includes the logical representation, in a data pipeline repository. In some non-limiting embodiments or aspects, data controller system 102 may generate a directed acyclic graph (DAG) of the data pipeline as the logical representation of the data pipeline. For example, data controller system 102 may generate the DAG of the data pipeline based on the metadata parameters.

As shown in FIG. 3, at step 308, process 300 may include executing the data pipeline. For example, data controller system 102 may execute the data pipeline based on the metadata parameters of the data pipeline. In some non-limiting embodiments or aspects, data controller system 102 may execute an application programming interface (API) call to determine whether an input dataset of the data pipeline is available. In some non-limiting embodiments or aspects, data controller system 102 may execute the data pipeline based on determining that the input dataset of the data pipeline is available. In some non-limiting embodiments or aspects, data controller system 102 may execute the data pipeline based on executing a job associated with the data pipeline. For example, data controller system 102 may execute the data pipeline based on executing a job associated with the data pipeline according to a schedule (e.g., a schedule provided by a scheduler service of data controller system 102). In some non-limiting embodiments or aspects, data controller system 102 may execute an executable file for the data pipeline based on determining that one or more input datasets of the data pipeline are available.

In some non-limiting embodiments or aspects, data controller system 102 may execute the data pipeline based on determining that one or more input datasets for the data pipeline are available (e.g., are available for consumption by the data pipeline). In some non-limiting embodiments or aspects, data controller system 102 may determine whether one or more input datasets for the data pipeline are available to a user (e.g., a consumer of an output of a data pipeline) based on a subscription, and data controller system 102 may execute the data pipeline based on determining that the user has a valid subscription to the one or more input datasets.

In some non-limiting embodiments or aspects, data controller system 102 may monitor activity of a data pipeline after the data pipeline is executed. For example, data controller system 102 may receive checkpoints associated with activity of the data pipeline after the data pipeline is executed.

In some non-limiting embodiments or aspects, data controller system 102 may determine one or more data parameters associated with the one or more data flow activities based on executing the one or more data flow activities and transmit a status message that includes the one or more data parameters associated with the one or more data flow activities. In some non-limiting embodiments or aspects, data controller system 102 may transmit a status message to user device 106. In some non-limiting embodiments or aspects, data controller system 102 may provide data associated with a status of a data pipeline and/or a dataset lineage of a data pipeline (e.g., data associated with data pipelines that are built on other data pipelines) in a UI that is displayed on user device 106.

As shown in FIG. 3, at step 310, process 300 may include modelling the data pipeline using the DAG of the data pipeline. For example, data controller system 102 may model the data pipeline using the DAG of the data pipeline. In some non-limiting embodiments or aspects, data controller system 102 may provide data associated with a status of the data pipeline in a UI. For example, data controller system 102 may determine the status of the data pipeline based on the DAG, and data controller system 102 may provide data associated with a status of the data pipeline in a UI displayed on user device 106 based on determining the status.

In some non-limiting embodiments or aspects, data controller system 102 may perform an action associated with error correction of a data pipeline. For example, data controller system 102 may perform an automated scanning operation based on a data pipeline. In some non-limiting embodiments or aspects, data controller system 102 may connect to a microservice (e.g., an application database associated with a microservice) to determine data associated with an error of a data pipeline. In some non-limiting embodiments or aspects, data controller system 102 may cause a peripheral (e.g., a peripheral device, a peripheral application, and/or the like) to connect to the microservice to determine the data associated with the error of the data pipeline.

In some non-limiting embodiments or aspects, data controller system 102 may check (e.g., periodically check) one or more jobs that are hosted (e.g., a hosted job, a plurality of hosted jobs, a specific hosted job, and/or the like) by data controller system 102. For example, data controller system 102 may check a hosted job that has started and progressively scans a status of the hosted job for an error associated with a failure of a data pipeline. In some non-limiting embodiments or aspects, data controller system 102 may determine whether a checkpoint has a failure, such as an upstream dataset validation failure (e.g., a host validation failure).

In some non-limiting embodiments or aspects, data controller system 102 may determine a type of a failure of a data pipeline, and data controller system 102 may perform an action associated with an error correction of the data pipeline based on the type of failure. In some non-limiting embodiments or aspects, the type of failures of a data pipeline may include a data driven failure. For example, a data driven failure may occur when a data entry is incorrect (e.g., incoming data to a pipeline has an error). In such an example, pipeline metadata may include a parameter, such as an identifier of a column, that defines how the data is structured, but the parameter might not fit a rule based on how the metadata parameter is defined. Additionally or alternatively, the types of failures of a data pipeline may include an execution driven failure. For example, an execution driven failure may be run-time in nature. In such an example, data controller system 102 may orchestrate a job and determine metrics associated with the job (e.g., health metrics of a machine executing the job and/or health metrics of the job). The metrics may be passed to a checkpoint service and the metrics may be compared to rules that define levels of operation (e.g., threshold values indicating proper operation of the machine, threshold values indicating proper execution of the job, and/or the like) based on the metrics. Additionally or alternatively, the types of failures of a data pipeline may include a validation driven failure. For example, a validation driven failure may occur when data is not appropriate based on a pipeline. In such an example, data controller system 102 may perform a proactive check to determine whether data (e.g., data entries of a dataset) is valid, such as determining whether value ranges of data are valid (e.g., whether value ranges of data are in an integer format versus string format).

In some non-limiting embodiments or aspects, data controller system 102 may perform a root cause analysis (RCA). For example, data controller system 102 may perform the RCA based on a type of a failure of a data pipeline, a status of a data pipeline, and/or a dependency generated as lineage (e.g., dataset lineage) for an execution plan of a data pipeline. In some non-limiting embodiments or aspects, data controller system 102 may perform an automatic restatement operation (e.g., an automatic operation for restarting a data pipeline from a specific point). For example, data controller system 102 may perform the automatic restatement operation based on a type of a failure of a data pipeline. In some non-limiting embodiments or aspects, if the automatic restatement operation resolves a failure that occurred with a job, the job may be restated. In some non-limiting embodiments or aspects, data controller system 102 may perform the automatic restatement operation in any of the following scenarios: a data pipeline was force triggered but an upstream dataset for the data pipeline was not fully created, a data source and/or a target data store are not reachable, and/or a cluster of devices (e.g., distributed computing system 104) executing a data pipeline had a resource failure (e.g., a spike of required resources, a crash of required resources, an intermittent error, and/or the like).

Figure 4:
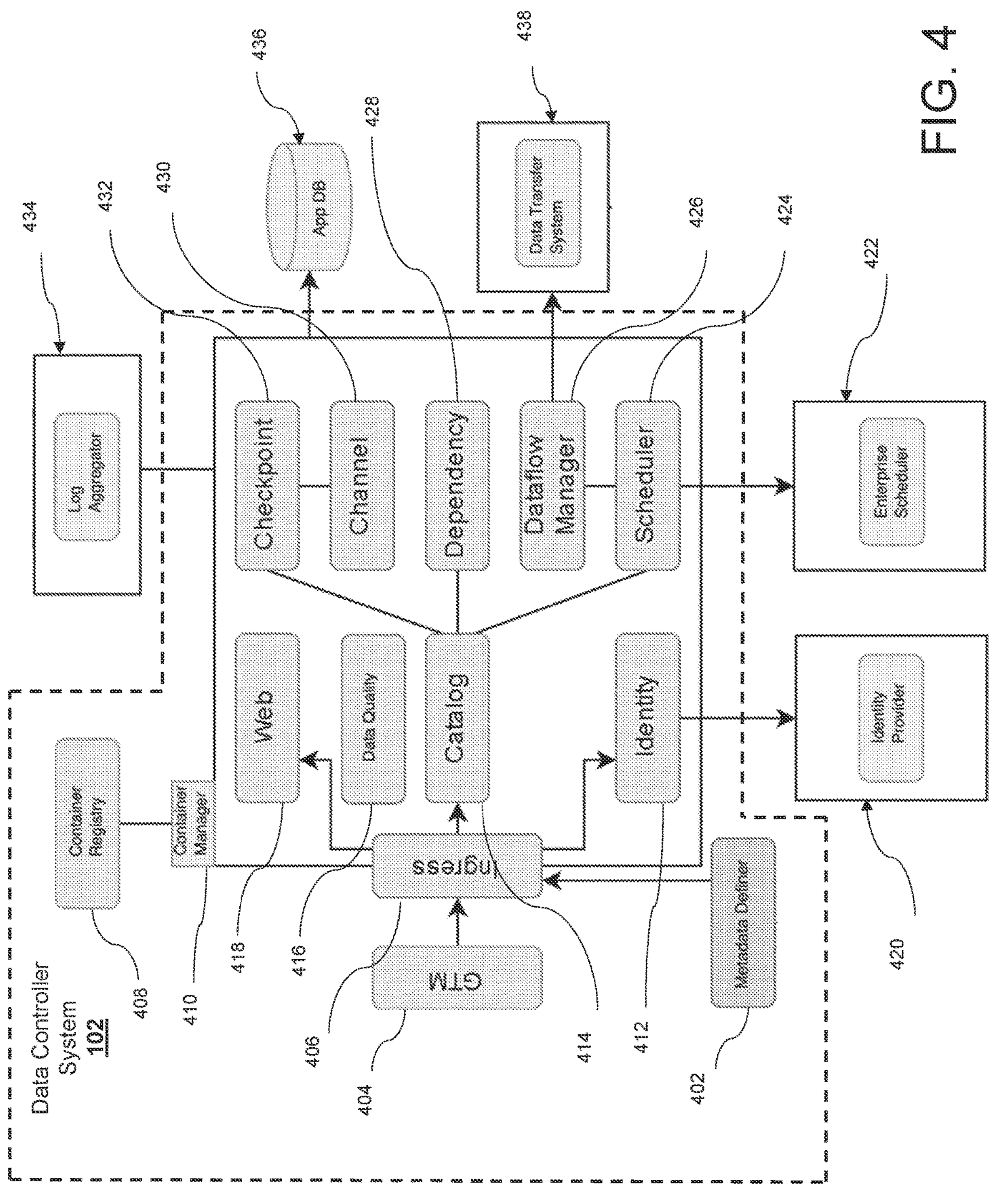
FIG. 4 is a diagram of non-limiting embodiments or aspects of components of a data controller system.

Referring now to FIG. 4, FIG. 4 is a diagram of components of data controller system 102. In some non-limiting embodiments or aspects, the components of data controller system 102 may be implemented by one or more computing devices, such as a server, a group of servers, and/or the like. In some non-limiting embodiments or aspects, the components of data controller system 102 may be implemented by one or more virtual resources, such as a virtual machine, a group of virtual machines, a container, a group of containers, and/or the like.

As shown in FIG. 4, the components of data controller system 102, including metadata definer 402, tag manager (GTM) 404, ingress control service 406, identity service 412, catalog service 414, data quality service 416, web service 418, scheduler service 424, dataflow manager 426, dependency service 428, channel service 430, and checkpoint service 432 may be implemented by one or more containers that are managed by container manager 410. In some non-limiting embodiments or aspects, container manager 410 may communicate with container registry system 408 to control instantiation of containers for data controller system 102.

In some non-limiting embodiments or aspects, metadata definer 402 may receive pipeline metadata (e.g., a log of input data for a data pipeline, transformation logic for a data pipeline, a log of output data for a data pipeline, and/or the like) from a user (e.g., a programmer, a data developer, and/or the like), such as a user associated with user device 106. In some non-limiting embodiments or aspects, metadata definer 402 may receive data associated with transformation logic of the pipeline where the data may include operators and configuration details of the data pipeline.

In some non-limiting embodiments or aspects, GTM 404 is a tag management system that allows for data tracking on websites and other applications. In some non-limiting embodiments or aspects, GTM 404 may receive pipeline metadata from a website or other application based on managed tags deployed on the website. For example, GTM 404 may be configured to tag the frequency of pdf downloads by users visiting a website, receive the analytics data for the number of total .pdf downloads during a predefined time period, and/or may send the analytics data to container manager 410 via ingress control service 406.

In some non-limiting embodiments or aspects, ingress control service 406 may be configured to expose uniform resource locators (URLs) corresponding to components of container manager 410 and control external access to these components. Ingress control service 406 may be configured to load balance network traffic and direct traffic to components of container manager 410.

In some non-limiting embodiments or aspects, catalog service 414 may store metadata coming from metadata definer 402 and/or may orchestrate function calls between various services, based on a type of an artifact, where an artifact may include a dataset, a publication, a subscription, a data pipeline, and/or the like. For example, catalog service 414 may receive metadata from metadata definer 402 and store metadata in JSON. In some non-limiting embodiments or aspects, catalog service 414 may call scheduler service 424 to create a job for the received metadata and may send the metadata to scheduler service 424 for validation.

In some non-limiting embodiments or aspects, web service 418 may provide a URL associated with a webpage associated with a data pipeline. Web service 418 may allow user device 106 to access a webpage through communication network 108. User device 106 may communicate a request comprising a URL to data controller system 102 to access web service 418. Ingress control service 406 may direct the request to web service 418.

In some non-limiting embodiments or aspects, data quality service 416 may provide data quality rules for incoming metadata. Data quality service 416 may analyze metadata according to the data quality rules to record data quality metrics. Data quality service 416 may use data quality metrics to produce data behavior trends and use those trends to predict future outcomes based on the data metrics.

In some non-limiting embodiments or aspects, identity service 412 may manage the identity and access management. Identity service 412 may be capable of controlling token-based access control and role-based access control to components in data controller system 102. Identity service 412 may receive user identities (e.g., username-passwords, tokens, and/or the like) or other entity identities (e.g., IP addresses, and/or the like) for authorization. Identity service 412 may communicate with identity provider system 420 via requests to validate user identities or other entity identities.

In some non-limiting embodiments or aspects, checkpoint service 432 may provide an interface for one or more extract, transform, and load (ETL) applications to monitor a status (e.g., determine a status of a checkpoint) of various stages in an ETL data pipeline which may provide dependency management and determine data availability for the ETL pipeline to consume one or more datasets. A status of the datasets may be displayed in a UI provided by checkpoint service 432.

In some non-limiting embodiments or aspects, channel service 430 may provide for dataset usage across applications associated with data controller system 102. For example, channel service 430 may be capable of authorizing access of an entity (e.g., a user) to datasets based on an attribute level of the data. In some non-limiting embodiments or aspects, data controller system 102 may provide channel service 430 in conjunction with identity service 412.

In some non-limiting embodiments or aspects, dependency service 428 may store data associated with a relation between an artifact at various levels for applications, activities, and/or datasets. The data may be used to generate one or more lineage representations (e.g., lineage graphs) associated with one or more datasets. In some non-limiting embodiments or aspects, dataflow manager service 426 may automatically cause the movement of data between disparate data sources and systems, such as data transfer system 438, so that data ingestion may be properly managed.

In some non-limiting embodiments or aspects, scheduler service 424 may schedule a data pipeline that is to be executed based on metadata parameters defined by metadata definer 402. Scheduler service 424 may provide abstraction for a data asset application from underlying schedulers. Scheduler service 424 may provide information to enterprise scheduler system 422 relating to a data pipeline such that enterprise scheduler system 422 may monitor and trigger tasks of the data pipeline.

In some non-limiting embodiments or aspects, container registry 408 may comprise a list of containers and container managers which may be deployed to distributed computing system 104. In some non-limiting embodiments or aspects, identity provider system 420 may comprise a list of identity credentials and authorization levels. For example, identity provider system 420 may comprise a username-password combination for a user identity and RBAC levels associated with a user identity.

In some non-limiting embodiments or aspects, enterprise scheduler system 422 may include a scheduler, such as Airflow, D-Series, Control-M, and/or the like. Enterprise scheduler system 422 may receive information from scheduler service 424 relating to the data pipeline such that enterprise scheduler system 422 may monitor and trigger tasks of a data pipeline.

In some non-limiting embodiments or aspects, log aggregator system 434 may be a system that receives data associated with a log for one or more data pipelines and aggregates the data as appropriate. For example, log aggregator system 434 may aggregate data based on metadata parameters of a plurality of data pipelines. In some non-limiting embodiments or aspects, application database 436 may include a data structure that stores information associated with one or more applications that function in association with and/or are operated by data controller system 102.

Figure 5:
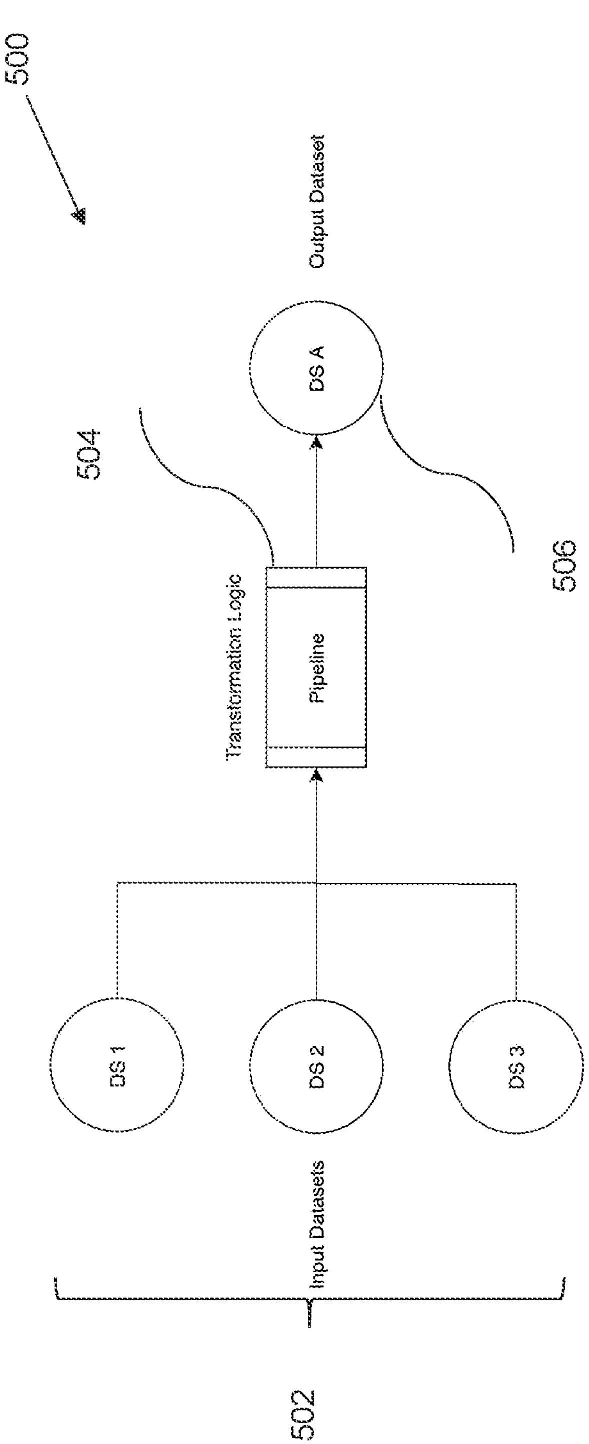
FIG. 5 is a diagram of non-limiting embodiments or aspects of a data pipeline ecosystem.

Referring now to FIG. 5, FIG. 5 is a diagram of data pipeline ecosystem 500. As shown in FIG. 5, data pipeline ecosystem 500 may include a plurality of input datasets 502 (e.g., labeled as DS 1, DS 2, and DS 3) that provide input data to data pipeline 504, and data pipeline 504 may provide output data to output dataset 506 (e.g., labeled as DS A). In some non-limiting embodiments or aspects, data pipeline 504 may use transformation logic to process the input data to provide the output data of data pipeline 504.

Figure 6:
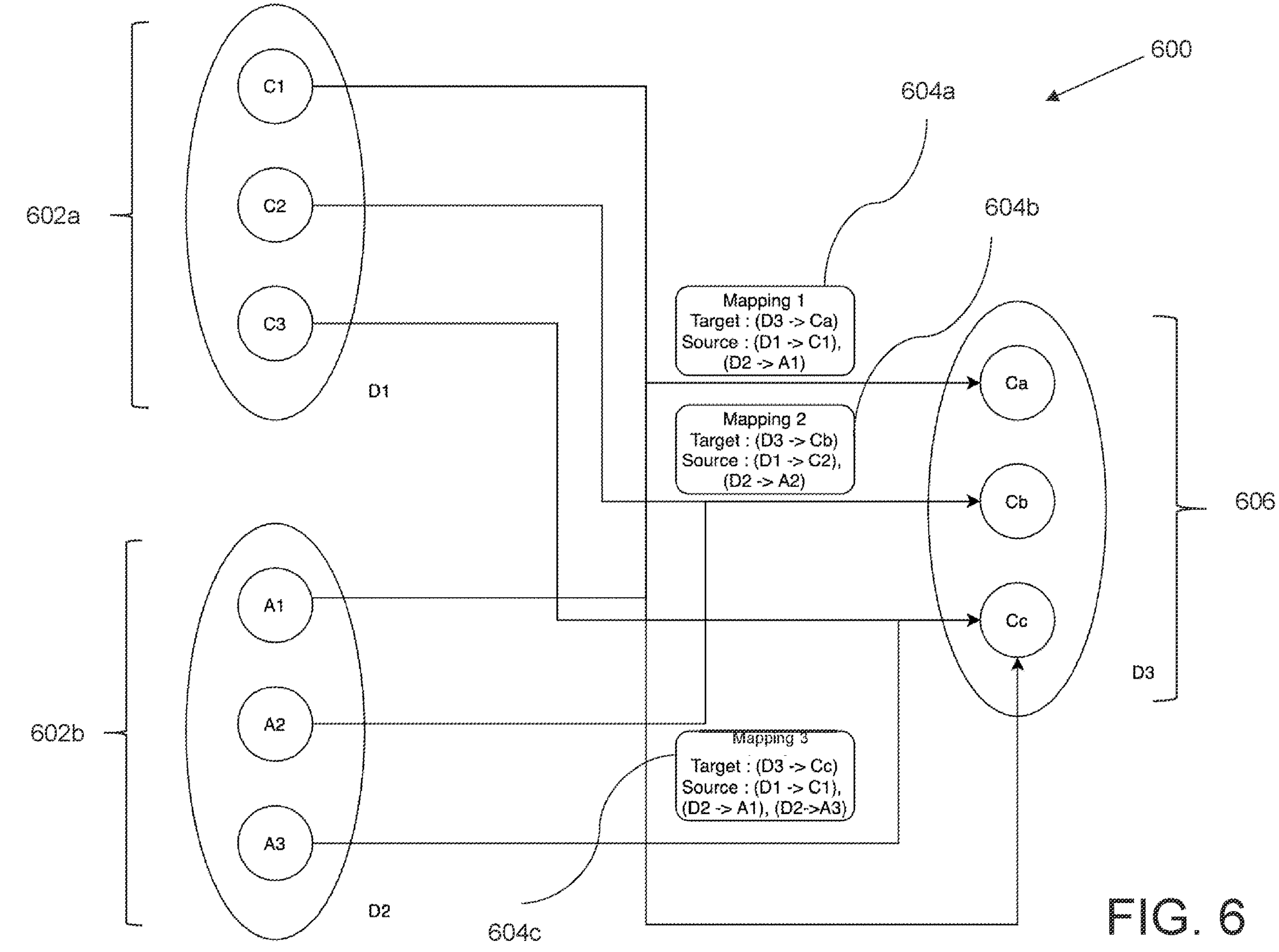
FIG. 6 is a diagram of non-limiting embodiments or aspects of a data pipeline ecosystem.

Referring now to FIG. 6, FIG. 6 is a diagram of data pipeline ecosystem 600. As shown in FIG. 5, data pipeline ecosystem 500 may include a first plurality of input datasets 602*a* (e.g., labeled as C1, C2, and C3) and second plurality of input datasets 602*b* (e.g., labeled as A1, A2, and A3) that provide input data to a data pipeline (not shown), and the data pipeline may provide output data to output location 606 that includes a plurality of output datasets (e.g., labeled as Ca, Cb, and Cc) according to data mappings 604*a*, 604*b*, and 604*c*. As further shown in FIG. 6, mappings 604*a*, 604*b*, and 604*c* include data indicating a combination of an individual input dataset from first plurality of input datasets 602*a* and an individual dataset from second plurality of input datasets 602*b* that constitute a source that is provided to an individual dataset that is a target dataset (e.g., destination dataset) of output location 606.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for determining a characteristic of a data pipeline, comprising:

receiving, with at least one processor, metadata parameters for a data pipeline, wherein the metadata parameters for the data pipeline comprise at least one of the following: data associated with one or more input datasets of a data pipeline, data associated with transformation logic of a data pipeline, data associated with a mapping of an input to an output of a data pipeline, data associated with one or more output datasets of a data pipeline, or any combination thereof;

storing, with at least one processor, the metadata parameters in a data repository;

generating, with at least one processor, a logical representation of the data pipeline based on the metadata parameters;

using, with at least one processor, the metadata parameters to instantiate the data pipeline in a distributed computing system;

executing, with at least one processor, an application programming interface (API) to determine whether an input dataset of the data pipeline is available;

executing, with at least one processor, the data pipeline based on the metadata parameters of the data pipeline and based on determining that the input dataset of the data pipeline is available;

modeling, with at least one processor, the data pipeline using the logical representation of the data pipeline;

monitoring, with at least one processor, activity of the data pipeline after the data pipeline is executed, wherein monitoring the activity of the data pipeline comprises:

receiving checkpoints associated with activity of the data pipeline after the data pipeline is executed;

performing, with at least one processor, an automated scanning operation on the data pipeline to obtain data associated with an error of the data pipeline;

determining, with at least one processor, a type of a failure of the data pipeline based on the data associated with the error of the data pipeline; and performing, with at least one processor, an automatic restatement operation based on the type of the failure of the data pipeline, wherein the automatic restatement operation comprises an automatic operation for restarting the data pipeline from a specific checkpoint.

2. The computer implemented method of claim 1, further comprising:

providing data associated with a status of the data pipeline in a user interface (UI).

3. The computer implemented method of claim 1, further comprising:

determining data quality metrics associated with the data pipeline based on an output dataset of the data pipeline; and displaying the data quality metrics associated with the data pipeline in a UI.

4. The computer implemented method of claim 1, further comprising:

executing one or more data flow activities using the data pipeline based on executing the data pipeline.

5. The computer implemented method of claim 4, further comprising:

determining one or more data parameters associated with the one or more data flow activities based on executing the one or more data flow activities; and transmitting a status message that includes the one or more data parameters associated with the one or more data flow activities.

6. The computer implemented method of claim 1, wherein the metadata parameters comprise:

a log of one or more input datasets;

wherein the method further comprising:

generating an executable file based on the metadata parameters of the data pipeline;

wherein executing the data pipeline comprises:

executing the executable file for the data pipeline based on determining that the one or more input datasets of the data pipeline are available.

7. A system for determining a characteristic of a data pipeline, comprising:

at least one processor, wherein the at least one processor is programmed or configured to:

receive metadata parameters for a data pipeline, wherein the metadata parameters for the data pipeline comprise at least one of the following: data associated with one or more input datasets of a data pipeline, data associated with transformation logic of a data pipeline, data associated with a mapping of an input to an output of a data pipeline, data associated with one or more output datasets of a data pipeline, or any combination thereof;

store the metadata parameters in a data repository;

generate a logical representation of the data pipeline based on the metadata parameters;

use the metadata parameters to instantiate the data pipeline in a distributed computing system;

execute an application programming interface (API) to determine whether an input dataset of the data pipeline is available;

execute the data pipeline based on the metadata parameters of the data pipeline and based on determining that the input dataset of the data pipeline is available;

model the data pipeline using the logical representation of the data pipeline;

monitor activity of the data pipeline after the data pipeline is executed, wherein, when monitoring the activity of the data pipeline, the at least one processor is programmed or configured to:

receive checkpoints associated with activity of the data pipeline after the data pipeline is executed;

perform an automated scanning operation on the data pipeline to obtain data associated with an error of the data pipeline;

determine a type of a failure of the data pipeline based on the data associated with the error of the data pipeline; and perform an automatic restatement operation based on the type of the failure of the data pipeline, wherein the automatic restatement operation comprises an automatic operation for restarting the data pipeline from a specific checkpoint.

8. The system of claim 7, wherein the at least one processor is further programmed or configured to:

provide data associated with a status of the data pipeline in a user interface (UI).

9. The system of claim 7, wherein the at least one processor is further programmed or configured to:

determine data quality metrics associated with the data pipeline based on an output dataset of the data pipeline; and display the data quality metrics associated with the data pipeline in a UI.

10. The system of claim 7, wherein the processor is further programmed or configured to:

execute one or more data flow activities using the data pipeline based on executing the data pipeline.

11. The system of claim 10, wherein the at least one processor is further programmed or configured to:

determine one or more data parameters associated with the one or more data flow activities based on executing the one or more data flow activities; and transmit a status message that includes the one or more data parameters associated with the one or more data flow activities.

12. The system of claim 7, wherein the metadata parameters comprise:

a log of one or more input datasets;

wherein the at least one processor is further programmed or configured to:

generate an executable file based on the metadata parameters of the data pipeline;

wherein, when executing the data pipeline, the at least one processor is programmed or configured to:

execute the executable file for the data pipeline based on determining that the one or more input datasets of the data pipeline are available.

13. A computer program product, the computer program product comprising at least one non-transitory computer readable medium including one or more instructions that, when executed by at least one processor, cause the at least one processor to:

receive metadata parameters for a data pipeline, wherein the metadata parameters for the data pipeline comprise at least one of the following: data associated with one or more input datasets of a data pipeline, data associated with transformation logic of a data pipeline, data associated with a mapping of an input to an output of a data pipeline, data associated with one or more output datasets of a data pipeline, or any combination thereof;

store the metadata parameters in a data repository;

generate a logical representation of the data pipeline based on the metadata parameters;

use the metadata parameters to instantiate the data pipeline in a distributed computing system;

execute an application programming interface (API) to determine whether an input dataset of the data pipeline is available;

execute the data pipeline based on the metadata parameters of the data pipeline and based on determining that the input dataset of the data pipeline is available;

model the data pipeline using the logical representation of the data pipeline;

monitor activity of the data pipeline after the data pipeline is executed, wherein, the one or more instructions that cause the at least one processor to monitor the activity of the data pipeline, cause the at least one processor to:

receive checkpoints associated with activity of the data pipeline after the data pipeline is executed;

perform an automated scanning operation on the data pipeline to obtain data associated with an error of the data pipeline;

determine a type of a failure of the data pipeline based on the data associated with the error of the data pipeline; and perform an automatic restatement operation based on the type of the failure of the data pipeline, wherein the automatic restatement operation comprises an automatic operation for restarting the data pipeline from a specific checkpoint.

14. The computer program product of claim 13, wherein the one or more instructions further cause the at least one processor to:

provide data associated with a status of the data pipeline in a user interface (UI).

15. The computer program product of claim 13, wherein the one or more instructions further cause the at least one processor to:

determine data quality metrics associated with the data pipeline based on an output dataset of the data pipeline; and display the data quality metrics associated with the data pipeline in a UI.

16. The computer program product of claim 13, wherein the one or more instructions further cause the at least one processor to:

execute one or more data flow activities using the data pipeline based on executing the data pipeline.

17. The computer program product of claim 16, wherein the one or more instructions further cause the at least one processor to:

determine one or more data parameters associated with the one or more data flow activities based on executing the one or more data flow activities; and transmit a status message that includes the one or more data parameters associated with the one or more data flow activities.

* * * * *